United States Patent [19]
Hassel et al.

[11] Patent Number: 5,488,203
[45] Date of Patent: Jan. 30, 1996

[54] FORCE COMPENSATOR FOR INERTIAL MASS MEASUREMENT INSTRUMENT

[75] Inventors: David R. Hassel, Wynantskill; Lauren R. Basch, East Greenbush, both of N.Y.

[73] Assignee: Rupprecht & Patashnick Company, Inc., Albany, N.Y.

[21] Appl. No.: 147,852

[22] Filed: Nov. 5, 1993

[51] Int. Cl.⁶ .......................... G01G 21/10; G01G 3/14; G01N 29/00
[52] U.S. Cl. .......................... 177/184; 177/185; 177/189; 177/210 FP; 73/668
[58] Field of Search .................... 177/184, 185, 177/186, 187, 188, 189, 210 FP; 73/662, 668

[56] References Cited

U.S. PATENT DOCUMENTS

| | | | |
|---|---|---|---|
| 2,901,239 | 8/1959 | Sethna | 177/184 |
| 3,926,271 | 12/1975 | Patashnick | 177/210 |
| 4,391,338 | 7/1983 | Patashnick et al. | 177/210 |
| 4,696,181 | 9/1987 | Rupprecht et al. | 177/210 FP X |
| 4,838,371 | 6/1989 | Rupprecht et al. | 177/210 |
| 4,929,874 | 5/1990 | Mizuno et al. | 73/668 X |

*Primary Examiner*—Peter S. Wong
*Assistant Examiner*—Randy W. Gibson
*Attorney, Agent, or Firm*—Heslin & Rothenberg

[57] ABSTRACT

In an inertial mass measurement instrument, an active force compensator compensates for inertial forces transmitted by an oscillating elastic element to a primary support of the instrument. The compensator applies equal and opposite compensating forces to the primary support along an effective line of action of the oscillating element. Application of the compensating forces result in a substantially zero net acceleration of the primary support and avoids measurement inaccuracies attributable to changes in properties of secondary support elements.

19 Claims, 3 Drawing Sheets

FORCE COMPENSATOR FOR INERTIAL MASS MEASUREMENT INSTRUMENT

BACKGROUND OF THE INVENTION

1. Technical Field

This invention relates generally to inertial balances used to measure mass and more particularly, to an active force compensator for an inertial balance which improves the stability and measurement accuracy of such instruments.

2. Background Art

Inertial balances measure mass inertially and can therefore operate independent of gravity and in any orientation. Such instruments are used in a wide variety of technically demanding industrial and research applications in areas ranging from coal mines to outer space.

Generally, an inertial mass measurement instrument consists of a mass-spring system where the mass to be measured is put into oscillation while being supported by an elastic element having a known spring rate. When the mass to be measured changes magnitude, the natural or resonant frequency of the system changes. This frequency change is measured and then used to calculate the mass change. However, when the elastic element is not affixed securely to the earth, the mass, spring constant and damping properties of support structures can influence the resonant frequency of the system and result in erroneous mass readings. The purpose of this invention is to eliminate such erroneous readings.

In an ideal inertial mass measurement system in which the elastic element supporting the mass to be measured is affixed to a stable inertial reference, the resonant frequency of the system is uniquely determined by the equation:

$$f^2 = (\tfrac{1}{4}Pi^2)(Kg/W)(1-C^2),$$

where f is the resonant frequency, K is the spring constant, g is the gravitational constant, W is the weight of the oscillating mass, and C is the fraction of critical damping contributed by the internal and external damping of the elastic element and oscillating mass.

Real systems can only approximate the stable inertial reference on which the above equation relies for accuracy. Real systems have no firm connection to the earth and thus have far more complex equations which yield two or more resonant frequencies. To uniquely determine the primary resonant frequency associated with the motion of the elastic element and oscillating mass, these complex equations, which include terms or factors for each mass, spring and damping property in the supporting structure, have to be taken into account. If the value of any of the properties of any of the supporting structure elements change, the primary resonant frequency also changes. Usually the inertial instrument manufacturer does not have control over secondary support elements, which include the tables, shelves or other supports employed by the user. Such support elements are subject to property changes through temperature variations, aging and other environmental effects. These property changes result in spurious frequency changes that are not related to mass loading.

In the past, passive suspensions and passive compensators have been employed in attempts to limit the effects of these property changes to a tolerable level. However, none were capable of eliminating the effects entirely.

U.S. Pat. No. 3,926,271 describes an extremely sensitive inertial microbalance capable of measuring the mass of very fine particles and other matter. This instrument employs a tapered elongate elastic element having a first end which supports matter to be measured and a second larger end which is anchored to a primary support so that the first end and matter carried thereby are free to oscillate. The elongate element is excited into oscillation at a resonant frequency. The resonant frequency of the oscillating element varies in accordance with the mass loading and accordingly can be monitored and measured to determine the mass of matter supported by the oscillating element. An improvement which facilitates use of this microbalance for the measurement of the mass of particulate or other forms of matter contained within a medium such as air or other fluids is described in U.S. Pat. No. 4,391,338. The contents of these two patents are incorporated by reference herein.

In practice, the oscillating tapered element microbalance has proven to be a valuable instrument which permits on-line, real-time direct measurement of particulate mass with great sensitivity and reliability. The instrument has been successfully employed in the evaluation of diesel exhaust, dust concentration and smoke measurement, and is applicable to many other situations in which particles or other extremely fine forms of matter need to be detected and weighed.

The tapered element in the above-described microbalance vibrates in a clamped/free mode. At the clamped end, where the tapered element meets the housing or primary support, energy flows out from the oscillating tapered element through the housing into the secondary support structure. As generally described above, this transfer and dissipation of energy into the secondary support structure introduces a frequency uncertainty which can affect the accuracy of the microbalance.

One approach for coping with this problem is to attach the housing of the microbalance to a larger rigid distributed mass which is then decoupled by standard means such as a foam rubber cushion from the environment. However, this approach is rather cumbersome and not suitable for certain applications.

In U.S. Pat. No. 4,696,181 a DECOUPLING SUSPENSION SYSTEM FOR AN OSCILLATING ELEMENT MICROBALANCE is described which employs longitudinally extending suspension members axially aligned with an instantaneous center of rotation of the microbalance. The suspension members store energy transferred out of the oscillating element through the housing and then return this energy to the housing. This passive mechanical suspension system thus isolates motion of the balance from the secondary support structure and external environment but causes the housing to rock, posing difficulties in attaching hoses or other auxiliary equipment to the moving housing.

An improvement in the measurement accuracy of inertial mass balances is provided, according to the teachings of U.S. Pat. No. 4,838,371, by a suspension system which constrains an oscillating weighing platform to undergo uniform linear motion. This suspension system includes a primary support framework and a plurality of elongate elastic supporting members for suspending the weighing platform from the support framework. In one embodiment, counterweights are attached to extensions of the supporting members. The counterweights are selected and employed to compensate for displacement of the center of mass of the moving portion of the inertial balance. As a result, during vibration, the center of mass of the entire system stays fixed with respect to the support framework thereby preventing force from being relayed through the framework to the outside world and minimizing damping losses to the outside. Although this mechanical approach provides a first order passive compensation for inertial forces, it doesn't permit automatic adjustment with mass loading and is not universally applicable to all inertial mass balances.

A need therefore persists for a compensator for inertial mass measuring instruments which enables accurate frequency readings to be continually taken free from the influence of property changes in the secondary support structure.

SUMMARY OF THE INVENTION

This need is satisfied and the shortcomings of the prior art overcome, according to the principles of the present invention, by the addition of an active force compensator to an inertial mass measurement instrument. The instrument includes an elastic element having a first portion for supporting matter to be measured and a second portion secured to a primary support. The elastic element is driven into oscillation at a resonant frequency which varies with mass loading. Changes in resonant frequency are sensed as a measure of mass loading. Oscillation of the elastic element transmits inertial forces to the primary support. The active force compensator actively applies oscillating compensating forces to the primary support to cancel these inertial forces. The primary housing therefore experiences substantially no net acceleration due to the inertial forces.

The active force compensator preferably applies compensating physical forces equal and opposite to said inertial forces along an effective line of action of the oscillating element. The compensator is electrically driven with the drive signal preferably derived from an output signal of a motion sensor in the instrument. The compensator drive signal has a frequency the same as that of the sensor output signal and a phase which is shifted with respect to the phase of the sensor output signal. The gain or amplitude of the compensator drive signal is varied to produce a resultant substantially zero net acceleration of the primary support. Signal amplitude can readily be determined by a nulling operation using an accelerometer attached to the primary support. Amplitude can be set initially or adjusted periodically based on the accelerometer readings, or the amplitude of the compensator drive signal can be varied automatically as a function of the frequency of the compensator drive signal. Alternatively, a local peak in sensed frequency of the oscillating element can be determined and employed to set compensator drive signal amplitude.

The active compensating forces can be applied to the primary support by an inertial compensating mass driver of electromagnetic, piezoelectric or other type, or by a different reaction force driver, for example an air jet. The active force compensator of the present invention is applicable to all types of inertial mass measurement instruments including the tapered element oscillating microbalance and the constrained linear motion inertial balance described in the Background Art section.

Accordingly, a principal object of the present invention is to improve the accuracy of an inertial mass measurement instrument by actively compensating for inertial forces transmitted to a primary support of the instrument by the oscillating elastic element.

A related object is to avoid frequency uncertainty and mass measurement errors due to changes in properties of secondary support elements.

Another object is to minimize energy transfer and dissipation into the secondary support structure of the measurement instrument and minimize motion of a primary support.

A further object is to improve performance of an inertial mass measurement instrument in a practical, cost-effective and widely applicable manner.

BRIEF DESCRIPTION OF THE DRAWINGS

These and other objects, features and advantages of the invention will be more readily understood from the following detailed description when read in conjunction with the accompanying drawings, in which.

DETAILED DESCRIPTION

The present invention is based upon the realization that certain measurement accuracy deficiencies common to existing inertial balances result from energy transfer out of the instrument into the support structure. The present invention seeks to avoid sensed frequency changes that are not related to mass loading but rather are due to changes in properties of secondary support elements. To overcome this problem, the present invention applies active compensating forces to cancel inertial forces transmitted by an oscillating elastic element to a primary support. This approach produces a substantial improvement in the accuracy of the inertial balance.

Figure 1:
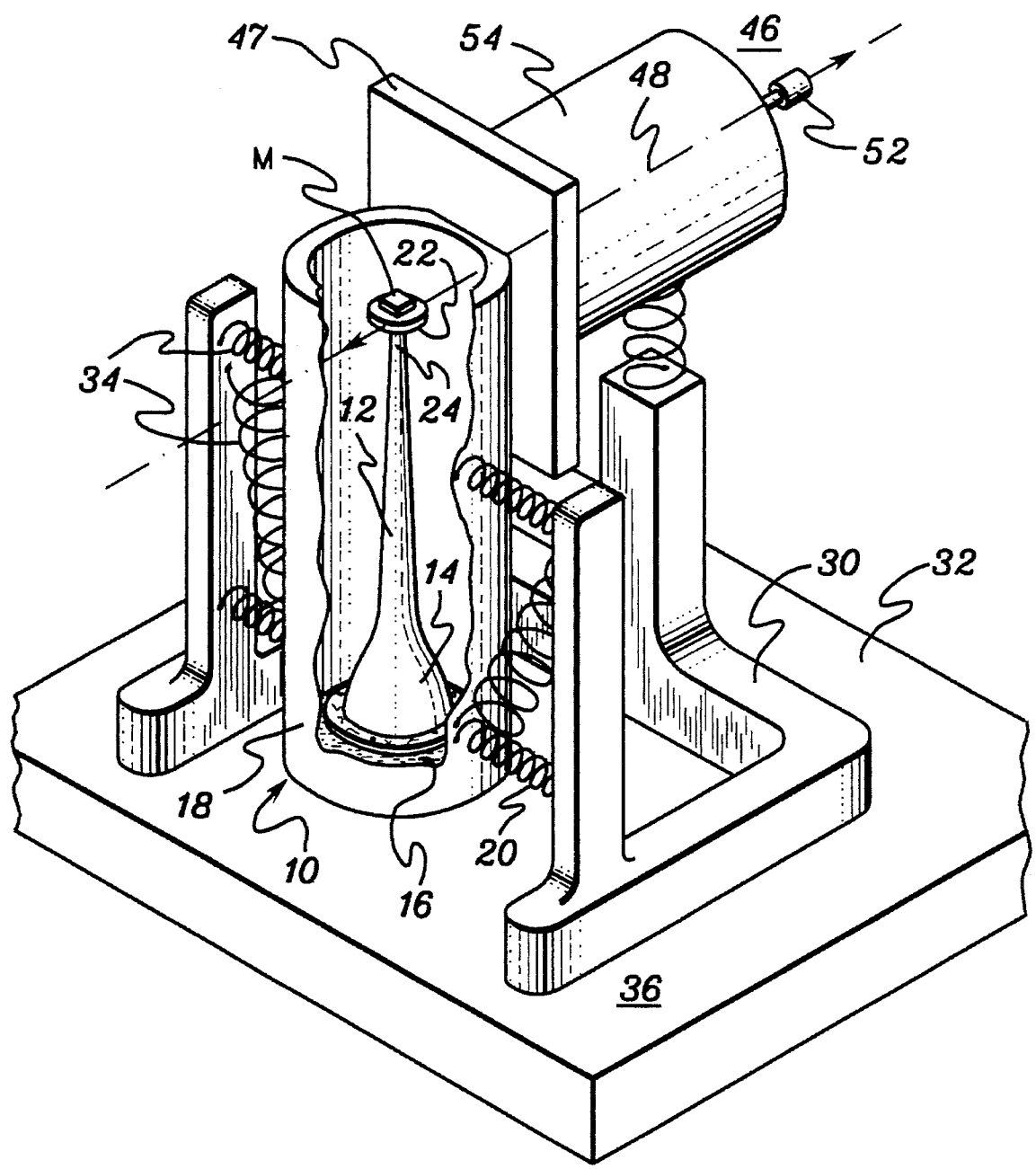
FIG. 1 is a simplified, partially cut-away perspective view of a tapered element oscillating microbalance incorporating an active force compensator of the present invention.
Figure 2:
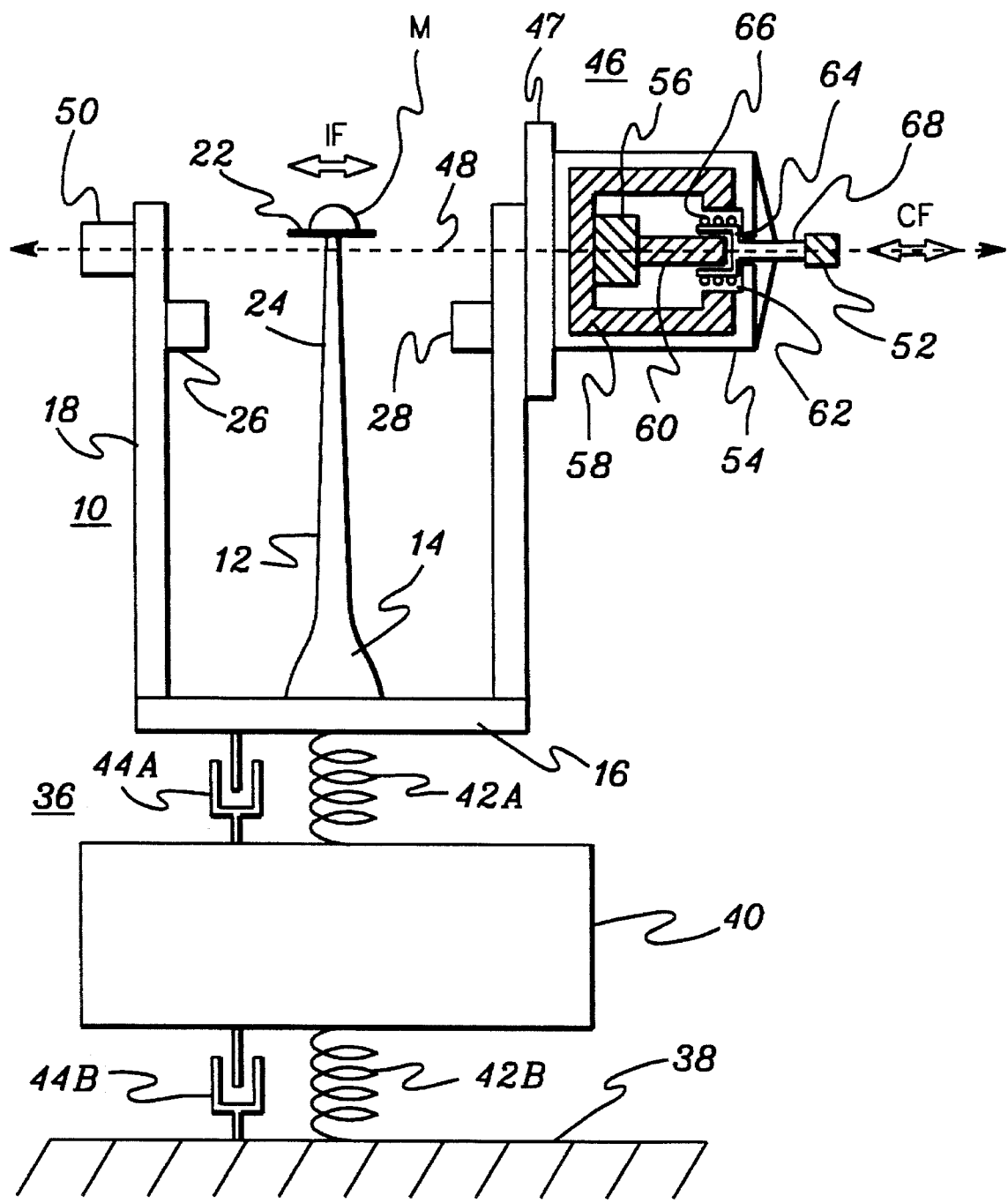
FIG. 2 is a schematic side-sectional view of the apparatus of FIG. 1.

The active force compensator of the present invention is applicable to any inertial mass measurement instrument. For illustrative purposes, a tapered element oscillating microbalance 10 is depicted in FIGS. 1 and 2. Microbalance 10 includes an elongate elastic element 12 supporting matter M to be measured. Element 12 is preferably tapered as shown and hollow. The larger end 14 of elastic element 12 is anchored to a base 16 of a primary support or housing 18. Although illustrated as cylindrical, primary support 18 may take other shapes and configurations and is designed to at least partially enclose tapered element 12 and provide convenient attachment points for a suspension system 20.

A matter supporting substrate or filter 22 is located atop the other end 24 of elastic element 12. End 24, substrate 22 and any matter M supported thereon are free to oscillate relative to primary support 18 when excited by drive 26. The frequency of oscillation of elastic element 12 is detected by a motion-detecting transducer or sensor 28. Drive 26 and sensor 28 can be advantageously mounted on primary support 18 as shown in FIG. 2 and may take any of various forms as described in U.S. Pat. No. 3,926,271.

As shown in FIG. 1, microbalance 10 can be suspended by suspension system 20 from a secondary support member 30 resting on a table top or other work surface 32. Suspension system 20 may include a plurality of mechanical springs 34 or other suspending or support elements. Suspension system 20, support member 30 and work surface 32 are elements of a supporting structure collectively referred to herein as secondary support 36.

Generally, secondary support 36 includes all support elements located between primary support 18 and the earth or other stable inertial reference 38. As shown in FIG. 2, secondary support 36 can be represented by an intermediate mass 40 and spring constants 42a and 42b, and damping properties 44a and 44b. It is the effect of changes in these properties of secondary support 36 upon the primary resonant frequency of oscillating element 12, which the present invention seeks to avoid.

In operation, the free end 24 of elastic element 12 is excited into oscillation at a natural or resonant frequency by drive 26. When matter is added to the free end of the oscillating element 12, the resonant frequency shifts downward, with the magnitude of the frequency change being dependent upon mass loading. Thus, by monitoring and measuring the variation in the resonant frequency of the oscillating tapered element 12, precise mass determinations can be made. Details of the construction and operating principles of the tapered element oscillating microbalance are presented in U.S. Pat. Nos. 3,926,271 and 4,391,338 and, accordingly are not repeated herein.

In other inertial mass measurement instruments, the elastic element need not be tapered, hollow or elongate. Similarly, the primary support may comprise a platform or framework rather than a housing. Hoses or other auxiliary equipment (not shown) may be connected to the instrument. The secondary support may also take many different forms, including either alternative or no suspension system. The active force compensator of the present invention is applicable to inertial mass measurement instruments encompassing any of these or other variations.

Referring again to the tapered element oscillating microbalance 10 illustrated in FIGS. 1 and 2, the vibratory motion of the oscillating components (i.e. free end 24, substrate 22 and mass M) is carried via the elastic element 12 to the primary support 18. The inertial force exerted by the oscillation normally produces an acceleration of primary support 18 tending to displace the primary support and various elements of the secondary support structure. In the absence of the present invention, suspended primary support 18 tends to rock back and forth and energy is transferred out of the oscillating element 12 through primary support 18 to secondary support 36. Because of this coupling, changes in properties, e.g. damping effects of elements of secondary support 36 due to temperature variations, aging or other environmental factors, can compromise the frequency readings and associated mass measurements of the microbalance.

The present invention solves this problem by adding an active force compensator 46 to microbalance 10. Compensator 46 is secured via a mounting plate 47 to primary support 18. Compensator 46 applies active compensating forces to primary support 18 to cancel the inertial forces transmitted to support 18 by oscillating element 12. The compensating forces CF are made equal in magnitude and opposite in direction to the inertial forces IF so that primary support 18 experiences substantially no net acceleration or displacement. The influence of property changes of elements of secondary support 36 upon the sensed resonant frequency of the oscillating element 12 of the instrument can thus be avoided, and significant improvements in measurement accuracy achieved.

For maximum effectiveness, i.e. full cancellation of the inertial forces, the compensating forces CF are applied along an effective line of action 48 of the oscillating components, i.e. the oscillating portion of the elastic element, any substrate and any other mass supported thereon (hereinafter referred to simply as the "effective line of action of the oscillating elastic element"). In the tapered element oscillating microbalance 10, the oscillating components technically travel along an arc but for all practical purposes, since the amplitude of oscillation is small, that arc can be approximated by a straight line 48. Therefore, in practice, linear application of the compensating forces CF is satisfactory to compensate for motion of the oscillating element. Moreover, very significant improvement in performance can be achieved even if compensator 46 is only approximately aligned along the effective line of action 48.

The location of effective line of action 48 can be experimentally determined by temporarily attaching a sensitive accelerometer 50 to primary support 18 in the general vicinity of the effective line of action. Compensator 46 is then attached to primary support 18 so that its line of action is approximately aligned with the effective line of action 48 of the oscillating element 12. Next, the phase and amplitude of the compensator drive signal are adjusted to minimize the reading of accelerometer 50. The compensator attachment location is then adjusted until the lowest reading of acceleration is attained, signifying compensator alignment with effective line of action 48.

Active force compensator 46 is electrically driven at the sensed resonant frequency of the oscillating element 12 of the inertial mass measurement instrument, as more fully described hereinafter. The compensating forces CF may be produced by oscillating a compensating mass 52 with a compensator driver 54. Other inertial or reaction force drivers, e.g. piezoelectric or air jet, may also be used to produce the active compensating forces.

An electromagnetic compensator mass driver 54 is shown, by way of example, in FIG. 2. Driver 54 includes a permanent magnet 56 with two pole pieces 58 and 60 configured to leave a gap 62 between the pole pieces. A drum 64 with an electrical coil 66 wound about it is inserted into gap 62. Compensating mass 52 is connected to drum 64 by a stem 68. Alternating current passing through coil 66 interacts with the magnetic field created by permanent magnet 56 and channeled by pole pieces 58 and 60 into gap 62, causing drum 64 and the attached stem 68 and compensating mass 52 to oscillate, thereby producing the active compensating forces CF. Active force compensator 46 is constructed so that its own resonant frequency is preferably far removed from that of oscillating element 12. Compensator 46 is driven to track the sensed resonant frequency of oscillating element 12. Preferably, the drive signal for compensator 46 is derived from the electrical output of motion sensor 28.

Figure 3:
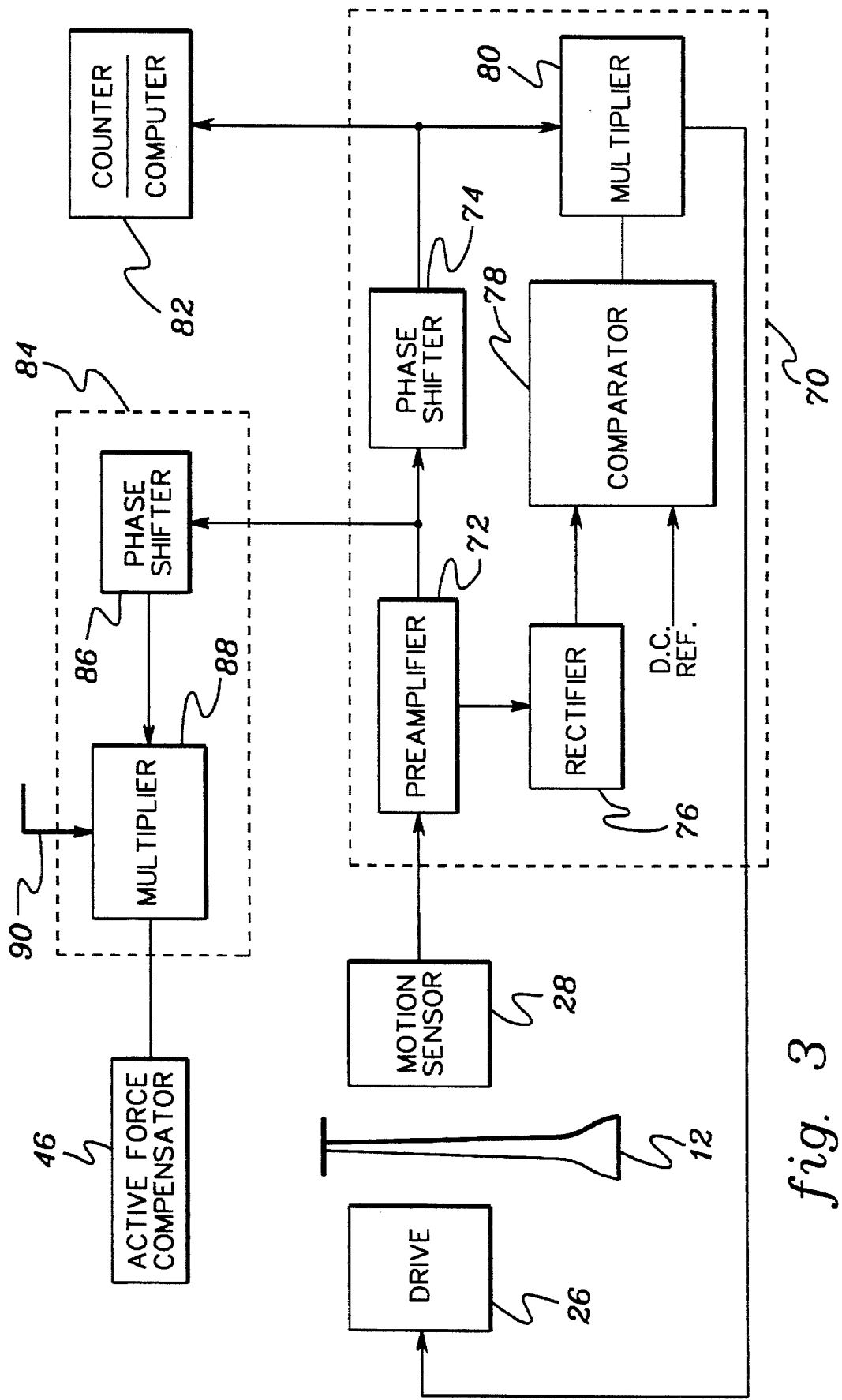
FIG. 3 is a simplified block level diagram of circuitry useful in driving an active force compensator of the present invention.

As shown in FIG. 3, motion sensor 28 provides an AC output signal to a drive feedback amplifier 70. Within drive feedback amplifier 70, the output signal from motion sensor 28 is initially preamplified by preamplifier 72 and then applied both to a phase shifter 74 and a rectifier 76. Phase shifter 74 shifts the phase of the output signal appropriately, e.g. by 90°, as needed for driver 26 to maintain elastic element 12 in oscillation at a resonant frequency. Rectifier 76 rectifies the output signal so that its amplitude can be compared with a DC reference by comparator 78. The phase and frequency information output from phase shifter 74 and amplitude information output from comparator 78 are combined in multiplier 80 to form an appropriate drive signal for driver 26. Frequency information output from phase shifter 74 can also conveniently be provided to a counter/computer 82 for mass determination in a fashion well known in the art.

The output of preamplifier 72 can also be provided to an auxiliary adjustable gain amplifier 84 used to drive active force compensator 46. Auxiliary amplifier 84 includes a phase shifter 86 for appropriately shifting the phase of the incoming signal, e.g. by 180°, and a multiplier 88 for adjusting the gain of the compensator drive signal in accordance with a DC reference provided to multiplier 88 along line 90. The output of auxiliary amplifier 84 is the drive compensator signal for active force compensator 46.

Auxiliary amplifier 84 determines the frequency, phase and amplitude of the motion of compensating mass 52. The frequency of this motion matches the sensed resonant frequency. The electrical phase of the compensator drive signal is adjusted so that the physical phase of the compensating mass 52 is 180 degrees out of phase with the oscillating element 12 of the balance. Preferably, a sensitive accelerometer 50 is temporarily attached to primary support 18 along the effective line of action 48 and the phase and amplitude of the compensator drive signal is then adjusted to give a net substantially zero acceleration indication with the elastic element oscillating. This approach also compensates for any phase or amplitude distortions in the electronic circuitry.

Instead of using the accelerometer to once, initially, set the amplitude of the compensator drive signal, the accelerometer can be left in place on the primary support 18 in order to periodically correct amplitude as mass loading occurs. Alternatively, a desired relationship of compensator drive signal amplitude as a function of signal frequency can be determined, stored in a look-up table and retrieved as needed by computer 82 to suitably adjust the amplitude of the compensator-drive signal as mass loading occurs. This latter approach facilitates automatic amplitude adjustment without the need for continuous monitoring of the acceleration of the primary support. Another approach which might be especially useful for fine tuning the compensator drive signal in the field or when an accelerometer is not otherwise readily available, would be to adjust the compensator drive signal amplitude until a local frequency peak is detected by sensor 28. This peak occurs when damping effects are minimized by the applied compensating forces CF.

The active force compensator of the present invention provides significant improvement in the performance of inertial mass measurement instruments. In one experiment in which a Mini-Shaker Type 4810 from Brüel & Kjaer of Denmark was used as the compensator mass driver, a greater than 90% reduction in motion of the housing of a tapered element oscillating microbalance and a 50 times reduction in influence on sensed frequency of the secondary support structure were achieved. The active force compensator of the present invention thus significantly improves the measuring accuracy of inertial mass measurement instruments and accomplishes the other objects set forth above. Although various specific embodiments have been described and depicted herein, it will be readily apparent to those skilled in this art that various modifications, rearrangements, substitutions and the like can be made without departing from the spirit of the invention. For example, other control schemes and compensator drive constructions can be employed to realize the benefits of the present invention. The scope of the invention is defined by the claims appended hereto.

What is claimed is:

1. An inertial mass measurement instrument exhibiting enhanced accuracy, comprising:

an elastic element having a first portion for supporting matter to be measured and a second portion secured to a primary support;

means for driving the elastic element into oscillation at a resonant frequency which varies with mass loading;

means for sensing changes in resonant frequency as a measure of mass loading; and electrically driven compensating force applying means acting on the primary support for actively compensating for inertial forces resulting from oscillation of the elastic element so that energy transfer and dissipation out of the oscillating elastic element through the primary support into a secondary support supporting the primary support, including any suspension system of the secondary support suspending the primary support, is minimized in order to avoid secondary support property changes from compromising mass measurements.

2. The apparatus of claim 1, wherein said compensating force applying means comprises means for actively applying compensating forces at the resonant frequency to the primary support to cancel inertial forces transmitted to the primary support by said oscillation, whereby the primary support remains substantially stationary despite said oscillation.

3. The apparatus of claim 2 wherein said compensating force applying means comprises means for actively applying compensating physical forces equal and opposite to said inertial forces along an effective line of action of the oscillating elastic element.

4. The apparatus of claim 3 wherein said compensating force applying means comprises means for oscillating a compensating mass along said effective line of action.

5. The apparatus of claim 4 wherein said compensating mass oscillating means comprises electromagnetic drive means.

6. The apparatus of claim 4 further comprising means for applying a compensator drive signal to said compensating mass oscillating means, said compensator drive signal having a frequency which is the same as a frequency of an output signal of said sensing means and a phase which is shifted with respect to the phase of said output signal.

7. The apparatus of claim 6 further comprising means for varying amplitude of said compensator drive signal to produce a resultant substantially zero net acceleration of the primary support.

8. The apparatus of claim 6 further comprising means for automatically varying amplitude of said compensator drive signal as a function of frequency of the compensator drive signal.

9. The apparatus of claim 6 further comprising means for setting amplitude of said compensator drive signal based upon detection of a local peak in sensed frequency of oscillation of the elastic element.

10. The apparatus of claim 7 wherein said elastic element has a tapered elongated profile, the first portion comprises a free end of the elastic element and the second portion comprises an enlarged opposite end of the element, and the primary support comprises a housing at least partially surrounding the elastic element.

11. An inertial mass measurement method, comprising the steps of:

providing an elastic element having a first portion for supporting matter to be measured and a second portion secured to a primary support;

driving the elastic element into oscillation at a resonant frequency which varies with mass loading;

sensing changes in resonant frequency as a measure of mass loading; and actively force compensating for inertial forces transmitted to the primary support by oscillation of the elastic element, such that the primary support experiences substantially no net acceleration due to said inertial forces and energy transfer and dissipation out of the oscillating elastic element through the primary support into a secondary support supporting the primary support, including any suspension system of the secondary support suspending the primary support, is minimized in order to avoid secondary support property changes from compromising mass measurements.

12. The method of claim 11 wherein said actively face compensating step comprises actively applying oscillating compensating forces to the primary support which cancel said inertial forces.

13. The method of claim 12 further comprising the steps of:
   determining an effective line of action of the oscillating element; and
   applying said compensating forces substantially along the effective line of action.

14. The method of claim 13 further comprising the steps of:
   instrumenting the primary support with an accelerometer; and
   determining said compensating forces by nulling said accelerometer during oscillation of the elastic element.

15. The method of claim 13 wherein said oscillating compensating forces have a magnitude equal to said inertial forces and a direction opposite to said inertial forces.

16. The method of claim 13 wherein said oscillating compensating forces operate at said resonant frequency and are phase shifted 180 degrees from said inertial forces.

17. The method of claim 12 further comprising the step of varying amplitude of said compensating forces to produce a resultant substantially zero net acceleration of the primary support.

18. The method of claim 12 further comprising the step of automatically varying amplitude of said compensating forces as a function of sensed resonant frequency.

19. The method of claim 12 further comprising the step of setting amplitude of the compensating forces based upon detection of a local peak in sensed frequency of oscillation of the elastic element.

* * * * *

UNITED STATES PATENT AND TRADEMARK OFFICE
CERTIFICATE OF CORRECTION

PATENT NO. : 5,488,203
DATED : January 30, 1996
INVENTOR(S) : Hassel et al.

It is certified that error appears in the above-indentified patent and that said Letters Patent is hereby corrected as shown below:

Column 9, line 7 substitute --force-- for "face".

Signed and Sealed this

Twenty-third Day of July, 1996

Attest:

BRUCE LEHMAN

Attesting Officer            Commissioner of Patents and Trademarks